United States Patent
Kojima

(10) Patent No.: US 8,025,084 B2
(45) Date of Patent: Sep. 27, 2011

(54) PNEUMATIC RADIAL TIRE

(75) Inventor: Hiroyuki Kojima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 667 days.

(21) Appl. No.: 12/128,162

(22) Filed: May 28, 2008

(65) Prior Publication Data

US 2008/0314496 A1 Dec. 25, 2008

(30) Foreign Application Priority Data

Jun. 19, 2007 (JP) ................. 2007-161696

(51) Int. Cl.
*B60C 15/00* (2006.01)
*B60C 15/06* (2006.01)
*B60C 9/00* (2006.01)

(52) U.S. Cl. ........ 152/539; 152/541; 152/542; 152/543; 152/546; 152/552; 152/554; 152/555

(58) Field of Classification Search .............. 152/555
See application file for complete search history.

(56) References Cited

U.S. PATENT DOCUMENTS 5,620,539 A * 4/1997 Ide ............................... 152/541
5,693,160 A * 12/1997 Kawabata et al. ......... 152/209.1

FOREIGN PATENT DOCUMENTS

| EP | 1559535 | * | 8/2005 |
| EP | 1640188 | * | 3/2006 |
| JP | A 64-83410 | | 3/1989 |
| JP | A 10-250321 | | 9/1998 |
| JP | A 2006-159944 | | 6/2006 |

* cited by examiner

Primary Examiner — Justin Fischer
(74) Attorney, Agent, or Firm — Greer, Burns & Crain, Ltd.

(57) ABSTRACT

A pneumatic radial tire has a nominal section width of 255 mm or more, and an outer diameter of 720 mm or more. At least one carcass layer is constructed between paired right and left bead cores with the two end portions of the carcass layer being folded back from the inside to the outside of the tire around the respective bead cores in a way that their corresponding bead fillers are enclosed in the two folded end portions thereof. The length of each bead filler in the radial direction of the tire is 5% to 20% of the section height of the tire. The carcass layer is formed of organic fiber cords each made of at least one type of organic fiber which has an expansion ratio of 1% to 5% when a load of 2.0 cN/dtex is applied to the organic fiber. A sheet-shaped rubber reinforcement layer with a thickness of 0.5 mm to 2 mm, whose rubber has a larger rigidity than that of the sidewall section, is interposed between the carcass layer and a sidewall section on each side of the tire.

19 Claims, 2 Drawing Sheets

PNEUMATIC RADIAL TIRE

FIELD OF THE INVENTION

The present invention relates to a pneumatic radial tire, and specifically to a pneumatic radial tire which is used for a SUV (sports and utility vehicle) in particular, and which meets the driving stability and light weight requirements at the same time although having its extraordinarily large section width and outer diameter.

DESCRIPTION OF THE PRIOR ART

A low-profile pneumatic radial tire with a nominal width (or a section width) of 255 mm and more, and with an outer diameter of 720 mm or more, is used for a SUV designed to meet the sports driving and utility requirements at the same time. The larger section height of such a large tire makes it difficult to secure the circumferential rigidity of the tire, and accordingly makes it difficult to obtain the sufficient driving stability. This has been problems with such a low-profile pneumatic radial tire for a SUV. For this reason, several means have been taken for increasing the circumferential rigidity, and for securing the driving stability. Examples of the means include forming the hard-rubber-made bead fillers to a larger size, and giving design arrangements to the rubber structure of each of the sidewall sections (see a Japanese patent application Kokai publication No. Sho. 64-83410). However, the larger bead fillers made of hard rubber increase the tire weight, and accordingly cause a worse fuel economy.

If the bead fillers are formed to a smaller size, the formation serves the purpose of merely decreasing the tire's weight. In the case where, however, the bead fillers are formed merely to a smaller size, the circumferential rigidity inevitably reduces, and the driving stability accordingly decreases. This brings about a problem that it is difficult to reconcile the light weight with the driving stability.

SUMMARY OF THE INVENTION

An object of the present invention relates to a pneumatic radial tire which has a large structure with a nominal width (or section width) of 255 mm or more, and with an outer diameter of 720 mm or more, and which meets the driving stability and light weight requirements at the same time.

The pneumatic radial tire according to the present invention for the purpose of achieving the foregoing object is the one which has a nominal section width of 255 mm or more, and an outer diameter of 720 mm or more, and in which at least one carcass layer is constructed between paired right and left bead cores with the two end portions of the carcass layer being folded back from the inside to the outside of the tire around the respective bead cores in a way that their corresponding bead fillers are enclosed in the two folded parts of the carcass layer, and in which a belt layer is arranged on the circumference of the carcass layer. The tire is characterized in that: the length ($L_b$) of each bead filler in the radial direction of the tire is 5% to 20% of the section height (SH) of the tire; the carcass layer is formed of organic fiber cords made of at least one type of organic fiber which has an expansion ratio of 1% to 5% when a load of 2.0 cN/dtex is applied to the organic fiber; and a sheet-shaped rubber reinforcement layer with a thickness of 0.5 mm to 2 mm, whose rubber has a larger rubber hardness than that of a sidewall section, is interposed between the carcass layer and the sidewall section on each side of the tire.

With regard to the tire construction, it is desirable that a rayon fiber should be used for the organic fiber cord.

It is desirable that the rubber hardness of each bead filler and each rubber reinforcement layer should measure 60 to 75 and 80 to 95, respectively, on the rubber hardness scale in compliance with JIS (Japanese Industrial Standards) K6253 Type A.

It is desirable that the length ($L_r$) of each rubber reinforcement layer in the radial direction of the tire should be 40% to 60% of the section height (SH) of the tire. In addition, it is desirable that, on each side of the tire, the distance ($h_1$) between the outer end of the rubber reinforcement layer in the radial direction of the tire and the end of the belt layer should be 5% to 25% of the section height (SH) of the tire, and/or that, on each side of the tire, the distance along a carcass line between the outer end of the rubber reinforcement layer in the radial direction of the tire and the end of a cap tread should be in a range of 5 mm to 20 mm.

In addition, it is desirable that the length ($L_b$) of each bead filler in the radial direction of the tire should be further shortened, and thus to be 5 mm to 25 mm. Furthermore, it is desirable that, on each side of the tire, a fiber reinforcement layer should be arranged around the bead core in a way that the fiber reinforcement layer is folded back from the inside to the outside of the tire with the bead filler being enclosed in the folded part of the fiber reinforcement layer, and that the height ($h_f$) of the outer end in the radial direction of the tire of the fiber reinforcement layer from a bead sheet should be 30% to 60% of the section height (SH) of the tire.

It is desirable that the pneumatic radial tire should include one or two carcass layers. In a case where the pneumatic radial tire includes a single carcass layer, it is desirable that, on each side of the tire, an end portion of the folded part of the single carcass layer should be inserted between the single carcass layer itself and the belt layers. In a case where the pneumatic radial tire includes two carcass layers, it is desirable that, on each side of the tire, an end portion of the folded part of one carcass layer should be inserted between the carcass layers and the belt layers, and an end portion of the folded part of the other carcass layer should stay in an area of a bead section or in an area of the sidewall section.

In the case where the pneumatic radial tire includes the two carcass layers, it is desirable that, on each side of the tire, the cord angle of the outer folded part is 84° to 88° to the circumferential direction of the tire, and the difference between the cord angle of the outer folded part and the cord angle of the inner folded part is set at not less than 2°.

It is desirable that the aspect ratio of the low-profile pneumatic radial tire according to the present invention is 55% or less.

Although the pneumatic radial tire according to the present invention is a large-sized pneumatic radial tire with a nominal section width of 255 mm or more, and with an outer diameter of 720 mm or more, the tire is light in weight and is capable of keeping its high driving stability for the following reasons. Firstly, on each side of the tire, the length ($L_b$) of the bead filler in the radial direction of the tire is shortened down to 5% to 20% of the section height (SH) of the tire. Secondly, the carcass layer is formed of at least one type of organic fiber cord which has the expansion ratio of 1% to 5% when a load of 2.0 cN/dtex is applied to the organic fiber. Thirdly, the sheet-shaped rubber reinforcement layer with a thickness of 0.5 mm to 2 mm, whose rubber has a large hardness than that of the sidewall section, is provided between the carcass layer and the sidewall section.

DESCRIPTION OF THE PREFERRED EMBODIMENTS

Figure 1:
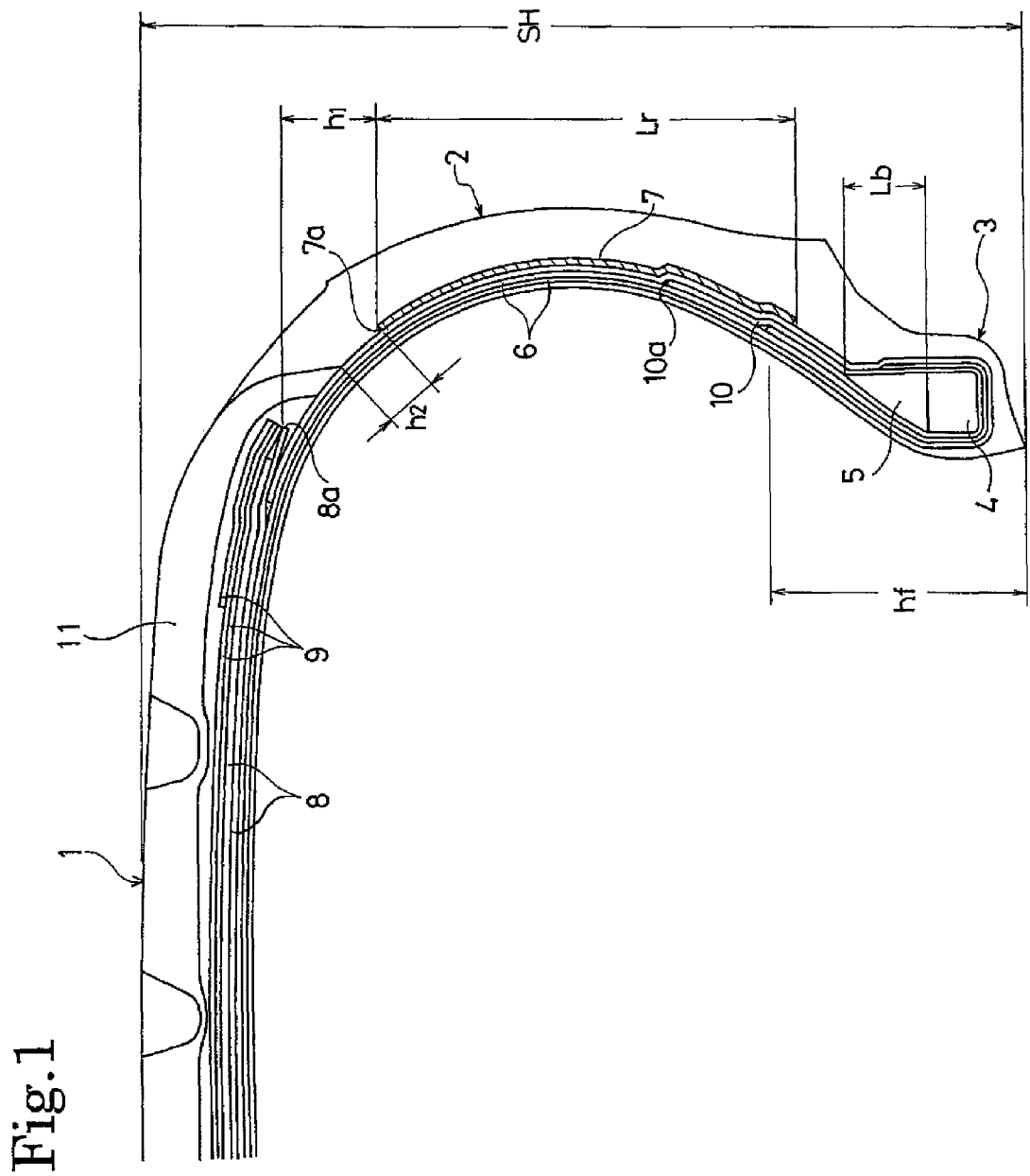
FIG. 1 is a cross-sectional view in the meridian direction showing a pneumatic radial tire according to an embodiment of the present invention.

A pneumatic radial tire has a large structure with a nominal section width of 255 mm or more, and with an outer diameter of 720 mm. In FIG. 1, reference numeral 1 denotes a tread section; 2, a sidewall section; and 3, a bead section. The nominal section width of the tire may be that specified by JATMA (Japan Automobile Tire Manufactures Association) standards, ETRTO (European Tyre and Rim Technical Organization) standards or TRA (Tire and Rim Association) standards.

Annular bead cores 4 are embedded in the paired right and left bead sections 3, respectively. An annular bead filler 5 with a shortened length ($L_b$) in the radial direction of the tire is provided along the circumference of each of the bead core 4. A carcass layer 6 is double-layered. The carcass layer 6 is constructed between the right and left bead sections 3 in a way the carcass layer 6 extends from the tread section 1 to the right and left bead sections 3 via their corresponding right and left sidewall sections 2. The two end portions of the carcass layer 6 are folded back from the inside to the outside of the tire around the respective bead cores 4 in a way that their corresponding bead fillers 5 are enclosed in the two folded end portions of the carcass layer 6. In the tread section 1, paired upper and lower belt layers 8 are arranged on the circumference of the carcass layer 6 in a way that the belt layers 8 go around the tire. Multiple belt cover layers 9 are arranged outside the belt layers 8 in a way that the multiple belt cover layers 9 cover the belt layers 8 through their full width and cover the two edge portions of each of the belt layers 8.

On each side of the tire, out of the folded parts of the respective two halves of the double-layered carcass layer 6, the folded part of the inner half thereof terminates on the side of the bead filler 5 whereas the folded part of the outer half thereof is inserted between the carcass layer 6 itself and the end portions of the respective belt layers 8. A sheet-shaped rubber reinforcement layer 7 which has a larger rubber hardness than the sidewall section 2 is arranged between the carcass layer 6 thus arranged and the sidewall section 2. Additionally, around the bead core 4, a fiber reinforcement layer 10 made of polyamide fibers is arranged on the inside of the carcass layer 6 in a way that the fiber reinforcement layer 10 is folded back from the inside to the outside of the tire with the bead filler 5 being enclosed in the folded part of fiber reinforcement layer 10.

In the present invention, the shortened length ($L_b$) of each bead filler 5 in the radial direction of the tire is designed to be 5% to 20% of the section height (SH) of the tire. It is more desirable that the length ($L_b$) of each bead filler 5 in the radial direction should be 5 mm to 25 mm. The shortening of the length of each bead filler 5 makes it possible to reduce the weight of the large-sized tire, and accordingly to enhance the durability of the tire under load in proportion to the large size of the tire.

It is desirable that the rubber hardness of each bead filler 5 should measure 60 to 75 on the rubber hardness scale in compliance with JIS K6253 Type A. When the rubber hardness is designed to be in this range, it is possible to enhance the load durability of the tire. In this respect, the rubber hardness means a value obtained by measuring the hardness of a piece of rubber by use of a durometer at a temperature of 25° C. in accordance with JIS K6253 Type A.

Each carcass layer 6 is formed of organic fiber cords each made of at least one type of organic fiber which has an expansion ratio of 1% to 5% when a load of 2.0 cN/dtex is applied to the organic fiber. When the organic fiber cords whose expansion ratio is in such a range are used, it is possible to increase the rigidity of the tire without increasing the weight of the tire. Examples of such an organic fiber of which the organic fiber cords are formed include a rayon fiber, an aramid fiber, a polyparaphenylene benzobis oxazole (PBO) fiber, a polyketone fiber. The rayon fiber is the most desirable among the fibers. The organic fiber cords may be formed solely of one of the foregoing fibers, or may be formed of a combination of multiple fibers. Otherwise, the organic fiber cords may be formed of a combination of at least one of the exemplified organic fibers and at least one of the other organic fibers including a nylon fiber and a polyester fiber.

On each side of the tire, a rubber layer with a thickness of 0.5 mm to 2 mm, whose rubber has a larger hardness than that of the sidewall section 2, is used as the rubber reinforcement layer 7 interposed between the carcass layers 6 and the sidewall section 2. The larger rubber hardness of the rubber reinforcement layer 7 makes it possible to increase the rigidity of the tire, and accordingly to enhance the driving stability and durability of the tire. It is desirable that the rubber hardness of the rubber reinforcement layer 7 should measure 80 to 95 on the rubber hardness scale in compliance with JIS K6253 Type A, and that the rubber reinforcement layer 7 should be harder than the bead filler. The combination of the smaller rubber hardness of the bead filler 5 and the larger rubber hardness of the rubber reinforcement layer 7 makes it possible to increase the circumferential rigidity of the side section of the tire with the durability of the tire being further increased, and accordingly to enhance the driving stability. If the thickness of the rubber reinforcement layer 7 is less than 0.5 mm, it is difficult to maintain the driving stability. If the thickness of the rubber reinforcement layer 7 is more than 2 mm, this thickness adversely affects the durability of the tire.

In addition, it is desirable that, on each side of the tire, the length ($L_r$) of the rubber reinforcement layer 7 in the radial direction of the tire should be in a range of 40% to 60% of the section height (SH) of the tire. If the length (Lr) is shorter than 40% of the section height (SH) of the tire, it is impossible to secure a sufficient circumferential rigidity for the side section of the tire. By contrast, if the length ($L_r$) is longer than 60% of the section height (SH) of the tire, it is impossible to reduce the weight of the tire.

It is desirable that, on each side of the tire, the location of the rubber reinforcement layer 7 with the foregoing length ($L_r$) in the radial direction of the tire in the sidewall section should be determined by considering a positional relationship between the rubber reinforcement layer 7 and the belt layers 8. Specifically, it is desirable that the distance ($h_1$) between the outer end 7a of the rubber reinforcement layer 7 and the ends 8a of the respective belt layers 8 in the radial direction of the tire should be 5% to 25% of the section height (SH) of the tire. When the distance ($h_1$) between the outer end 7a of the rubber reinforcement layer 7 and the ends 8a of the respective belt layers 8 is designed to be 5% to 25% of the section height (SH) of the tire, it is possible to enhance the driving stability and durability of the tire.

Furthermore, it is desirable that, on each side of the tire, the distance ($h_2$), along a carcass line, between the outer end 7a of the rubber reinforcement layer 7 in the radial direction of the tire and the end of a cap tread 11 in the tread section 1 should be in a range of 5 mm to 20 mm. When the distance ($h_2$) between the end of the cap tread 11 and the outer end 7a of the rubber reinforcement layer 7 is designed to be 5 mm or more, it is possible to maintain the durability of the tire. Concurrently, when the distance ($h_2$) is designed to be 20 mm or less, it is possible to enhance the driving stability thereof.

In the present invention, no specific restriction is imposed on the numbers of carcass layers. It is desirable that the pneumatic radial tire should include one or two carcass layers. In a case where the pneumatic radial tire includes a single carcass layer, it is desirable that an end portion of the folded part of the single carcass layer should be inserted between the carcass layer itself and the end portions of the respective belt layers 8. In this manner, when the pneumatic radial tire has a structure in which the end portion of the folded part of the carcass layer is inserted between the carcass layer itself and the belt layers 8, it is possible to enhance the driving stability and durability of the tire at the same time.

Figure 2:
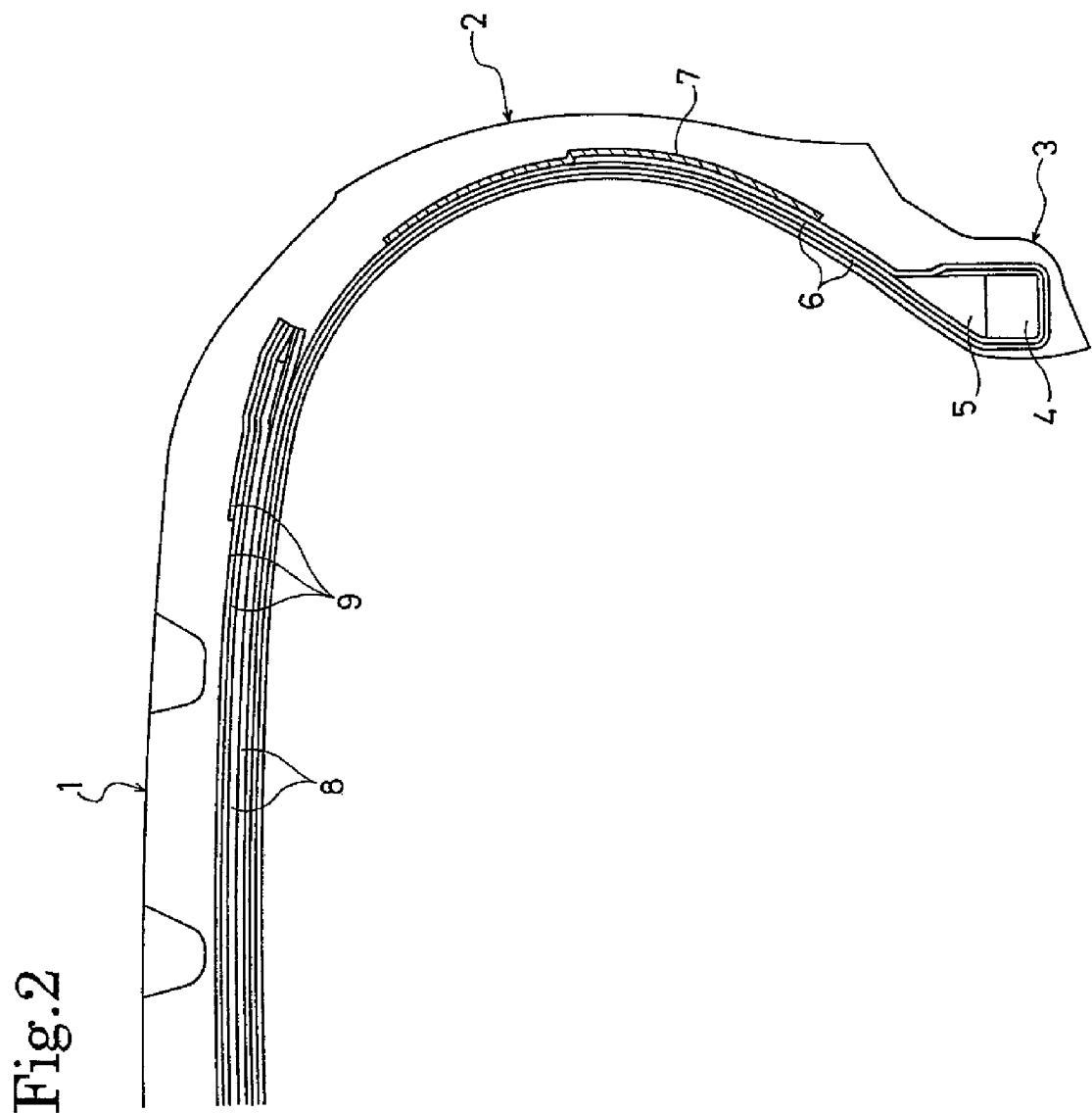
FIG. 2 is a cross-sectional view in the meridian direction showing a pneumatic radial tire according to another embodiment of the present invention.

In a case where the pneumatic radial tire includes two carcass layers, both of the folded parts of the respective two carcass layers may terminate in the bead section or in the sidewall section as illustrated in FIG. 2. It is desirable, however, that an end portion of the folded part of one carcass layer should be inserted between the carcass layers and the end portions of the respective belt layers whereas the folded part of the other carcass layer should terminate in an area corresponding to the bead section or the sidewall section. It is more desirable that the folded part inserted between the carcass layers and the end portions of the respective belt layers should be arranged on the outer side of the tire whereas the folded part terminating in the area corresponding to the bead section or the sidewall section should be arranged on the inner side of the tire. These arrangements make it possible to enhance the driving stability and durability of the tire at the same time.

In the case where the pneumatic radial tire includes the two carcass layers, it is desirable that the cords included in the outer folded part should be at an angle of 84° to 88° to the circumferential direction of the tire, and it is more desirable that the cords should be at an angle of 85° to 87° to the circumferential direction of the tire. Concurrently, it is desirable that the angle difference between the cords included in the outer folded part and the cords included in the inner folded part should be 2° or more. It is desirable that the inner folded part should be at an angle of 88° to 90° to the circumferential direction of the tire, and it is more desirable that the inner folded part should be at an angle of 90° to the circumferential direction thereof.

In the present invention, the fiber reinforcement layer 10 arranged around each bead core 4 in a way that the bead filler 5 is enclosed in the folded part of the fiber reinforcement layer 10 is not necessarily required (see FIG. 2). However, the inclusion of the fiber reinforcement layer 10 in the pneumatic radial tire makes it possible to further enhance the driving stability of the tire while keeping the tire light in weight. It is desirable that a polyamide fiber should be used as a material for the fiber reinforcement layer. Furthermore, it is desirable that, as shown in FIG. 1, the fiber reinforcement layer 10 should be interposed between the carcass layer(s) 6 and the bead core 4, and between the carcass layer(s) 6 and the bead filler 5.

It is desirable that the height ($h_f$) of the outer end 10a of the fiber reinforcement layer 10 from a bead sheet in the radial direction of the tire should be 30% to 60% of the section height (SH) of the tire. This arrangement of the fiber reinforcement layer 10 makes it possible to further increase the circumferential rigidity of the tire, and accordingly to enhance the driving stability and durability of the tire.

The present invention brings about the effect more obviously in the case where, as described above, the present invention is applied to a low-profile pneumatic tire which has an aspect ratio of 55% or less although the tire is constructed in a large-scale structure having a section width of 255 mm or more, and an outer diameter of 720 mm or more, under the JATMA standards, the ETRTO standards or the TRO standards.

Descriptions will be further provided for the present invention citing examples. It should be noted that the present invention is not limited to these examples.

EXAMPLES 1 TO 7 AND COMPARATIVE EXAMPLES 1 to 2

9 types of pneumatic radial tires (examples 1 to 7 and comparative examples 1 to 2) were constructed on the basis of the tire structure shown in FIG. 1, with the following three commonly-applied conditions, and with the following variable conditions which were changed as shown in Table 1. The commonly-applied conditions were the tire size of 255/55R18, the tire's outer diameter of 730 mm, and the rubber hardness of the sidewall section which measures 56 (on a durometer in compliance with JIS K6252 Type A). The variable conditions were concerned with types of cords used for the carcass layer, the structure of the carcass layer, the length ($L_b$) of the bead filler in the radial direction of the tire, the rubber hardness of the bead filler, the presence or absence of the rubber reinforcement layer, the structure of the rubber reinforcement layer if the tire includes the rubber reinforcement layer, the presence or absence of the polyamide fiber reinforcement layer, and the height ($h_f$) of the polyamide fiber reinforcement layer in the radial direction of the tire if the tire includes the polyamide fiber reinforcement layer.

The driving stability and lightness in weight of each of the 9 types of pneumatic radial tires thus obtained were evaluated by use of the following experimental method. The result of the evaluation is shown in Table 1.

TABLE 1

| | | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 |
|---|---|---|---|---|---|---|---|---|---|---|
| CARCASS LAYER | TYPE OF ORGANIC FIBER | RAYON | RAYON | RAYON | RAYON | ARAMID | RAYON | RAYON + ARAMID | PET | RAYON |
| | EXPANSION RATIO OF CORD [%] | 4.7 | 4.7 | 4.7 | 4.7 | 1.2 | 4.7 | 2.3 | 0.9 | 4.7 |

TABLE 1-continued

| | | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 |
|---|---|---|---|---|---|---|---|---|---|---|
| | NUMBER OF LAYERS [LAYERS] | 2 | 2 | 2 | 2 | 2 | 2 | 1 | 2 | 2 |
| | POSITION OF END OF FOLDED PART   INNER | α | α | α | α | α | α | — | α | α |
| | POSITION OF END OF FOLDED PART   OUTER | γ | γ | γ | γ | β | γ | γ | β | γ |
| | ANGLE OF CORDS INCLUDED IN OUTER FOLDED PART [DEGREES] | 90 | 90 | 90 | 90 | 90 | 86 | 90 | 90 | 90 |
| | ANGLE OF CORDS INCLUDED IN INNER FOLDED PART [DEGREES] | 90 | 90 | 90 | 90 | 90 | 90 | — | 90 | 90 |
| BEAD FILLER | LENGTH IN RADIAL DIRECTION ($L_b$) [%] | 25 | 20 | 15 | 15 | 15 | 15 | 15 | 45 | 40 |
| | RUBBER HARDNESS (JIS K6253 TYPE A) | 75 | 75 | 75 | 75 | 75 | 75 | 75 | 90 | 90 |
| RUBBER REINFORCEMENT LAYER | PRESENCE OR ABSENCE | PRESENT | PRESENT | PRESENT | PRESENT | PRESENT | PRESENT | PRESENT | ABSENT | ABSENT |
| | THICKNESS [mm] | 1 | 1 | 1 | 1 | 1 | 1 | 1 | — | — |
| | LENGTH IN RADIAL DIRECTION ($L_r$) [%] | 65 | 65 | 65 | 65 | 65 | 65 | 65 | — | — |
| | RUBBER HARDNESS (JIS K6253 TYPE A) | 90 | 90 | 90 | 90 | 90 | 90 | 90 | — | — |
| | DISTANCE BETWEEN ITS OUTER END AND END OF BELT LAYER ($h_1$) [%] | 25 | 25 | 25 | 25 | 25 | 25 | 25 | — | — |
| FIBER REINFORCEMENT LAYER | PRESENCE OR ABSENCE | ABSENT | PRESENT | PRESENT | PRESENT | PRESENT | PRESENT | PRESENT | ABSENT | ABSENT |
| | HEIGHT OF ITS OUTER END IN RADIAL DIRECTION ($h_f$) [mm] | — | 50 | 60 | 70 | 70 | 70 | 70 | — | — |
| DRIVING STABILITY INDEX | | 105 | 106 | 107 | 108 | 108 | 110 | 108 | 100 | 103 |
| LIGHTNESS IN WEIGHT INDEX | | 105 | 106 | 108 | 108 | 108 | 108 | 110 | 100 | 100 |

(*1) MEANING OF EACH REFERENCE SYMBOL INDICATING POSITION OF END OF FOLDED PART α: BEAD SECTION β: SIDEWALL SECTION γ: BETWEEN CARCASS LAYER AND BELT LAYERS

In Table 1, the length ($L_b$) of the bead filler in the radial direction of the tire, the length ($L_r$) of the rubber reinforcement layer in the radial direction of the tire, the distance ($h_1$) between the outer end of the rubber reinforcement layer and the end of the belt layer in the radial direction of the tire, and the height ($h_f$) of the outer end in the radial direction of the tire of the fiber reinforcement layer from the bead sheet are each indicated as a percentage of the section height (SH) of the tire. In addition, the position of the end of the folded part of the carcass layer is denoted by reference symbols α, β or γ. Reference symbol α means that the end of the folded part of the carcass layer terminates in the bead section. Reference symbol β means that the end of the folded part thereof terminates in the sidewall section. Reference symbols γ means that the end portion of the folded part thereof is inserted between the carcass layer and the end portions of the belt layers. Incidentally, the expansion ratio of the carcass cord was measured at a temperature of 25° C. when a load of 2.0 cN/dtex was applied to the carcass cord. The rubber hardness respectively of the bead filler and the rubber reinforcement layer were measured at a temperature of 25° C. by use of a durometer in compliance with JIS K6253 Type A.

Driving Stability

Pneumatic radial tires of each type were respectively mounted on wheel rims each with a size of 18×8J. The air pressure in each pneumatic radial tire was set at 260 kPa. Subsequently, the pneumatic radial tires of each type were installed on a four-wheel-drive car with a 4.8-liter engine. Thereafter, a skilled test driver organoleptically evaluated the driving stability of each type of pneumatic radial tires through comparing those tires with predetermined reference tires by driving the car in a 2 km-long course. The obtained evaluation results are indexed in comparison with an evaluation result of the tire for Comparative Example 1 which is indexed as 100. A tire with a larger index value means that the tire has a better driving stability.

Lightness in Weight

Relative lightness in weight of a pneumatic radial tire of each type is indicated as a percentage of the weight of the pneumatic radial tire for Comparative Example 1 by dividing the weight of the pneumatic radial tire of Comparative Example 1 by the weight of the pneumatic radial tire of each type. A tire with a larger value indicates that the tire is lighter in weight.

As clear from Table 1, it is proved that the pneumatic radial tires for Examples 1 to 7 are each capable of maintaining a better driving stability while being light in weight, because, on each side of the tire, the length ($L_b$) of the bead filler in the radial direction of the tire is shortened down to 5% to 20% of the section height (SH) of the tire, and the carcass layer is formed of the organic fiber cords each made of the organic fiber which has the expansion ratio of 1% to 5% when the load of 2.0 cN/dtex is applied to the organic fiber, as well as the sheet-shaped rubber reinforcement layer is provided between the carcass layer and the sidewall section. It should be noted that it is proved that the load durability of each of the pneumatic radial tires for Examples 1 to 7 is increased by 5% or more in comparison with that of the tire of Comparative Example 1.

What is claimed is:

1. A pneumatic radial tire which has a nominal section width of not less than 255 mm, and an outer diameter of not less than 720 mm, and in which at least one carcass layer is constructed between paired right and left bead cores with the two end portions of the carcass layer being folded back from the inside to the outside of the tire around the respective bead cores in a way that their corresponding bead fillers are enclosed in the two folded end portions of the carcass layer, and in which a belt layer is arranged on the circumference of the carcass layer, wherein:

the length ($L_b$) of each bead filler in the radial direction of the tire is 5% to 20% of the section height (SH) of the tire, the carcass layer is formed of organic fiber cords made of at least one type of organic fiber which has an expansion ratio of 1% to 5% when a load of 2.0 cN/dtex is applied to the organic fiber, and a sheet-shaped rubber reinforcement layer with a thickness of 0.5 mm to 2 mm, whose rubber has a larger rubber hardness than that of a sidewall section, is interposed between the carcass layer and the sidewall section on each side of the tire, wherein the pneumatic radial tire includes two carcass layers, and on each side of the tire, an end portion of the folded part of one carcass layer is inserted between the carcass layers and the belt layers, and an end portion of the folded part of the other carcass layer stays in any one of a bead section and the sidewall section.

2. The pneumatic radial tire according to claim 1, wherein the organic fiber cords are made of a rayon fiber.

3. The pneumatic radial tire according to claim 1, wherein the rubber hardness of each bead filler and each rubber reinforcement layer measure 60 to 75 and 80 to 95, respectively, on the rubber hardness scale in compliance with JIS K6253 Type A.

4. The pneumatic radial tire according to claim 1, wherein the length ($L_r$) of each rubber reinforcement layer in the radial direction of the tire is 40% to 60% of the section height (SH) of the tire.

5. The pneumatic radial tire according to claim 4, wherein on each side of the tire, the distance ($h_1$) in the radial direction between the outer end of the rubber reinforcement layer in the radial direction of the tire and the end of the belt layer is 5% to 25% of the section height (SH) of the tire.

6. The pneumatic radial tire according to claim 1, wherein the length ($L_b$) of each bead filler in the radial direction of the tire is 5 mm to 25 mm.

7. The pneumatic radial tire according to claim 1, wherein on each side of the tire, the cord angle of the outer folded part is 84° to 88° to the circumferential direction of the tire, and the difference between the cord angle of the outer folded part and the cord angle of the inner folded part is set at not less than 2°.

8. The pneumatic radial tire according to claim 1, wherein the aspect ratio is not more than 55%.

9. A pneumatic radial tire which has a nominal section width of not less than 255 mm, and an outer diameter of not less than 720 mm, and in which at least one carcass layer is constructed between paired right and left bead cores with the two end portions of the carcass layer being folded back from the inside to the outside of the tire around the respective bead cores in a way that their corresponding bead fillers are enclosed in the two folded end portions of the carcass layer, and in which a belt layer is arranged on the circumference of the carcass layer, wherein:

the length ($L_b$) of each bead filler in the radial direction of the tire is 5% to 20% of the section height (SH) of the tire, the carcass layer is formed of organic fiber cords made of at least one type of organic fiber which has an expansion ratio of 1% to 5% when a load of 2.0 cN/dtex is applied to the organic fiber, a sheet-shaped rubber reinforcement layer with a thickness of 0.5 mm to 2 mm, whose rubber has a larger rubber hardness than that of a sidewall section, is interposed between the carcass layer and the sidewall section on each side of the tire, and wherein the length ($L_r$) of each rubber reinforcement layer in the radial direction of the tire is 40% to 60% of the section height (SH) of the tire, wherein said tire includes a base tread and a cap tread and on each side of the tire, the distance, along a carcass line, between the outer end of the rubber reinforcement layer in the radial direction of the tire and an end of said cap tread is in a range of 5 mm to 20 mm.

10. The pneumatic radial tire according to claim 9, wherein the length ($L_r$) of each rubber reinforcement layer in the radial direction of the tire is 40% to 60% of the section height (SH) of the tire, and wherein on each side of the tire, the distance ($h_1$) in the radial direction between the outer end of the rubber reinforcement layer in the radial direction of the tire and the end of the belt layer is 5% to 25% of the section height (SH) of the tire.

11. A pneumatic radial tire which has a nominal section width of not less than 255 mm, and an outer diameter of not less than 720 mm, and in which at least one carcass layer is constructed between paired right and left bead cores with the two end portions of the carcass layer being folded back from the inside to the outside of the tire around the respective bead cores in a way that their corresponding bead fillers are enclosed in the two folded end portions of the carcass layer, and in which a belt layer is arranged on the circumference of the carcass layer, wherein:

the length ($L_b$) of each bead filler in the radial direction of the tire is 5% to 20% of the section height (SH) of the tire, the carcass layer is formed of organic fiber cords made of at least one type of organic fiber which has an expansion ratio of 1% to 5% when a load of 2.0 cN/dtex is applied to the organic fiber, and a sheet-shaped rubber reinforcement layer with a thickness of 0.5 mm to 2 mm, whose rubber has a larger rubber hardness than that of a sidewall section, is interposed between the carcass layer and the sidewall section on each side of the tire, wherein on each side of the tire, a fiber reinforcement layer is arranged around the bead core in a way that the fiber reinforcement layer is folded back from the inside to the outside of the tire with the bead filler being enclosed in the folded part of the fiber reinforcement layer, and the height ($h_f$) of the outer end in the radial direction of the tire of the fiber reinforcement layer from a bead sheet is 30% to 60% of the section height (SH) of the tire.

12. The pneumatic radial tire according to claim 11, wherein the length ($L_r$) of each rubber reinforcement layer in the radial direction of the tire is 40% to 60% of the section height (SH) of the tire, and wherein on each side of the tire, the distance ($h_1$) in the radial direction between the outer end of the rubber reinforcement layer in the radial direction of the tire and the end of the belt layer is 5% to 25% of the section height (SH) of the tire.

13. A pneumatic radial tire which has a nominal section width of not less than 255 mm, and an outer diameter of not less than 720 mm, and in which at least one carcass layer is constructed between paired right and left bead cores with the two end portions of the carcass layer being folded back from the inside to the outside of the tire around the respective bead cores in a way that their corresponding bead fillers are enclosed in the two folded end portions of the carcass layer, and in which a belt layer is arranged on the circumference of the carcass layer, wherein:

the length ($L_b$) of each bead filler in the radial direction of the tire is 5% to 20% of the section height (SH) of the tire, the carcass layer is formed of organic fiber cords made of at least one type of organic fiber which has an expansion ratio of 1% to 5% when a load of 2.0 cN/dtex is applied to the organic fiber, and a sheet-shaped rubber reinforcement layer with a thickness of 0.5 mm to 2 mm, whose rubber has a larger rubber hardness than that of a sidewall section, is interposed between the carcass layer and the sidewall section on each side of the tire, wherein the pneumatic radial tire includes a single carcass layer, and on each side of the tire, the end of the folded end portion of the single carcass layer is inserted between the carcass layer itself and the belt layers.

14. The pneumatic radial tire according to claim 13, wherein the organic fiber cords are made of a rayon fiber.

15. The pneumatic radial tire according to claim 13, wherein the rubber hardness of each bead filler and each rubber reinforcement layer measure 60 to 75 and 80 to 95, respectively, on the rubber hardness scale in compliance with JIS K6253 Type A.

16. The pneumatic radial tire according to claim 13, wherein the length ($L_r$) of each rubber reinforcement layer in the radial direction of the tire is 40% to 60% of the section height (SH) of the tire.

17. The pneumatic radial tire according to claim 16, wherein on each side of the tire, the distance ($h_1$) in the radial direction between the outer end of the rubber reinforcement layer in the radial direction of the tire and the end of the belt layer is 5% to 25% of the section height (SH) of the tire.

18. The pneumatic radial tire according to claim 13, wherein the length ($L_b$) of each bead filler in the radial direction of the tire is 5 mm to 25 mm.

19. The pneumatic radial tire according to claim 13, wherein the aspect ratio is not more than 55%.

* * * * *